United States Patent
Kim et al.

(10) Patent No.: US 9,267,221 B2
(45) Date of Patent: Feb. 23, 2016

(54) PHOSPHONATE FLAME-RETARDANT POLYESTER ARTIFICIAL HAIR AND METHOD OF PREPARING SAME

(71) Applicant: Uno & Company, Ltd., Jeollabuk-do (KR)

(72) Inventors: Jong Chun Kim, Jeollabuk-do (KR); Sung Min Oh, Jeollabuk-do (KR); Chan Young Kim, Jeollabuk-do (KR)

(73) Assignee: Uno & Company, Ltd., Jeollabuk-do (KR)

( * ) Notice: Subject to any disclaimer, the term of this patent is extended or adjusted under 35 U.S.C. 154(b) by 121 days.

(21) Appl. No.: 14/156,519

(22) Filed: Jan. 16, 2014

(65) Prior Publication Data

US 2015/0197875 A1  Jul. 16, 2015

(51) Int. Cl.
| | |
|---|---|
| *D01F 6/62* | (2006.01) |
| *A41G 3/00* | (2006.01) |
| *D02J 1/22* | (2006.01) |
| *D01F 1/07* | (2006.01) |
| *D01F 1/10* | (2006.01) |
| *C08K 5/00* | (2006.01) |
| *D01F 6/92* | (2006.01) |

(52) U.S. Cl.
CPC ............... *D01F 6/62* (2013.01); *A41G 3/0083* (2013.01); *D01F 1/07* (2013.01); *D01F 1/10* (2013.01); *D02J 1/22* (2013.01); *C08K 5/0066* (2013.01); *D01F 6/92* (2013.01); *D10B 2331/04* (2013.01); *D10B 2503/08* (2013.01)

(58) Field of Classification Search
CPC ............ C08K 5/0066; D01F 1/07; D01F 6/62
See application file for complete search history.

(56) References Cited

U.S. PATENT DOCUMENTS

| | | | |
|---|---|---|---|
| 7,759,429 B2 | 7/2010 | Kowaki et al. | |
| 7,759,430 B2 | 7/2010 | Kowaki et al. | |
| 8,211,542 B2 | 7/2012 | Masuda et al. | |
| 2009/0260646 A1* | 10/2009 | Masuda | 132/53 |
| 2010/0311920 A1* | 12/2010 | Gonzalez Montiel et al. | 525/92 E |
| 2012/0122843 A1 | 5/2012 | Macsri et al. | |

* cited by examiner

*Primary Examiner* — Michael Pepitone
(74) *Attorney, Agent, or Firm* — Kim Winston LLP

(57) ABSTRACT

A flame-retardant polyester artificial hair filaments is provided which comprises: (A) 100 parts by weight of a thermoplastic polyester resin; (B) 10-30 parts by weight of a polymeric phosphorus-based flame retardant; (C) 0.1-3 parts by weight of a chain extender; and (D) 0.5-3 parts by weight of sodium antimonate. The polymeric phosphorus-based flame retardant (B) may be a flame retardant having a repeat unit of formula 1 and a weight-average molecular weight ranging from 80,000 to 150,000. The flame-retardant polyester artificial hair filaments can be prepared by: extruding a composition comprising a mixture of a polyester resin, a polymeric phosphorus-based flame retardant, a chain extender and sodium antimonate to form a pellet; drying the pellet to a water content of 500 ppm or less; melt-spinning the dried pellet to prepare a undrawn yarn; drawing the undrawn yarn at a draw ratio of 2-5; and heat-treating the drawn yarn in a heat treatment device heated to a temperature of 150~280° C.

13 Claims, No Drawings

PHOSPHONATE FLAME-RETARDANT POLYESTER ARTIFICIAL HAIR AND METHOD OF PREPARING SAME

FIELD

The present disclosure relates to polyester filaments for artificial hair, and more particularly to phosphorus-based flame retardant polyester filaments for artificial hair, which contains a thermoplastic polyester resin or copolymerized polyester resin and a polymeric phosphorus-based flame retardant, artificial hair made from the filaments, and a method for preparing the filaments.

BACKGROUND

Artificial hair that is used as filaments for wigs is required to have flame retardancy and heat resistance in addition to a clear color, natural gloss, lightweight, heat resistance, a soft touch feeling, flexibility, and the abilities to form and retain curls. As used herein, the term "flame retardancy" is defined as a self extinguishing property and the anti-dripping property of molten polymers. The term "heat resistance" refers to the property of hair to resist the temperature at which curls can be formed by a hair iron, without being shrunk or deformed by thermal stress. Heat resistance and flame retardancy are the most important properties required for artificial hair filaments that perform the function of human hair.

PVC filaments or modacrylic filaments have been used as filaments for wigs. These filaments have very excellent flame retardancy, but have the disadvantage of insufficient heat resistance because of their low softening temperature, and for this reason, the use thereof in applications requiring heat resistance is limited.

To overcome this disadvantage, polyester artificial hair based on a resin having a relatively high heat distortion temperature is used. Examples of the resin that is used for polyester artificial hair include polyethylene terephthalate (PET), polybutylene terephthalate (PBT), polypropylene terephthalate (PPT), polycyclohexanedimethanol terephthalate (PCT), polynaphthalene terephthalate (PEN), etc. These polyester resins have a relatively high heat resistance, but are flammable resins that are easily burned and have the property of dripping high-temperature molten polymer drops upon contact with flames. Thus, in order to use these resins as artificial hair, flame retardancy needs to be imparted to these resins. Artificial hair has a thickness of 40-100 denier (corresponding to 40-100 µm), which is thicker than that of filaments for clothes. Because artificial hair is connected to the scalp or hair of a person who wears a wig, a high degree of flame retardancy needs to be imparted to the artificial hair in order to protect the wig-wearing person from a burn upon contact with flames.

A number of technologies for imparting flame retardancy to flammable thermoplastic polyester resins to use the resins as artificial hair are known.

Polyester resins are flammable, easily catch fire and are rapidly burned while dripping high-temperature molten polymer drops.

An attempt was made to use a copolymer resin synthesized by adding phosphorus (P) atoms during a polyester preparation process, but it was difficult for phosphorus atoms to provide sufficient flame retardancy to the resin for use as artificial hair. For this reason, a number of artificial hairs containing a polymeric brominated flame retardant are known.

U.S. Pat. Nos. 7,759,429, 7,759,430, 8,211,542 and 8,211,542 disclose a flame retardant polyester artificial hair containing a brominated epoxy flame retardant. However, the brominated flame retardant used in these patents has a shortcoming in that it has artificial hair becomes heavy due to the high specific gravity of the flame retardant, and thus has poor wear feeling. In addition, there is a problem in that bromine gas harmful to workers is generated in a process of compounding the polyester resin with the brominated flame retardant and a high-temperature melt spinning process. Further, workers can also be exposed to bromine gas in a process of drawing or heat-treating undrawn yarns. In a wig making process, workers are exposed to the same harmful gas when forming curls at a temperature of 100~130° C. for a long period of time. The biggest problem is that when the wig product is disposed of by incineration, large amounts of bromine compounds are discharged in a gaseous state to cause atmospheric pollution. For this reason, there is also a problem in that polymer fragments that are generated in a process of making frame-retardant polyester artificial hair are disposed of as waste without being recycled. Moreover, a wig made of polyester artificial hair containing the brominated flame retardant can be harmful to a person who wears it, because it is used in close contact with the scalp of the person. Thus, there is a need for new flame-retardant polyester artificial hair containing no brominated flame retardant. US Patent Publication No. 2012/0122843A discloses a thermoplastic polyester filaments containing a polymeric phosphorus-based flame retardant. The polyester filaments disclosed in this US Patent Publication comprises, in addition to a polyester resin, a polymeric phosphorus-based flame retardant that is a phosphonate-containing polymer, copolymer or oligomer. The polymeric phosphorus-based flame retardant has a weight-average molecular weight ranging from 10,000 to 120,000. However, the technology disclosed in this patent publication has the following problems that make it very difficult to produce an artificial hair filaments having a thickness of about 40-80 denier.

Conventional processes for producing flame-retardant polyester artificial filaments include a process of compounding raw materials, a melt spinning process, a drawing process and a heat treatment process. In the melt spinning process, a plurality of molten filaments are discharged through a plate nozzle below a die mounted at the front end of an extruder to form a filaments. The barrel temperature of the extruder is 250~280° C., and the temperature of the die and the nozzle portion is 280~290° C. However, if the polyester filaments containing the polymeric phosphorus-based flame retardant is used in a system for making polyester artificial hair containing a conventional brominated flame retardant, the following problems will arise.

The glass transition temperature (Tg) of the polymeric phosphorus-based flame retardant used is lower than that of the conventional brominated flame retardant by 40~50° C., and the flow rate of the molten polymer at the temperature of the die and the nozzle is very high. Further, if the polymeric phosphorus-based flame retardant is added in an amount of 10-30 parts by weight based on 100 parts by weight of the polyester resin, the polyester resin will contain a large amount of phosphorus (P) which reduces the melt viscosity of the polyester resin.

As a result, when phosphorus-based artificial hair having a thickness of 40-80 denier is to be produced, the discharge of the polymer from the lower portion of the nozzle in the melt spinning process will not be uniform, and the melt tension of the molten polymer will be reduced, making it impossible to wind undrawn yarns having a specific thickness. Further, filament breakage will occur during melt spinning, making it impossible to continuously prepare undrawn yarns, and a filaments obtained by drawing and heat-treating prepared drawn yarns will have low strength and elongation, and thus cannot be used as artificial hair.

The present inventor has developed a phosphorus-based flame retardant polyester filaments for artificial hair, which does not cause the above-described problems even when it contains the polymeric phosphorus-based flame retardant, and a method for preparing the filaments.

SUMMARY

The present disclosure provides a novel polyester artificial hair filaments, which is prepared by melt-spinning a composition comprising a mixture of a polyester resin and a phosphorus-based flame retardant and has a strength and elongation suitable for use as artificial hair.

The present disclosure also provides polyester artificial hair filaments, which provides artificial hair having no broken filament and comprising uniform filaments.

The present disclosure also provides polyester artificial hair filaments which have excellent flame retardancy and drip resistance even when containing a small amount of a flame retardant.

The present disclosure also provides polyester artificial hair filaments which have high gloss, a clear color, good curl formability, lightweight, physical properties similar to those of human hair, and excellent fundamental properties required for wig filaments.

The present disclosure also provides environmentally friendly polyester artificial hair filaments which do not contain a brominated flame retardant that generates toxic bromine gas during incineration.

The above and other embodiments of the present disclosure can all be accomplished by the present disclosure as described in detail below.

A flame-retardant polyester artificial hair filaments according to the present disclosure comprises: (A) 100 parts by weight of a thermoplastic polyester resin; (B) 10-30 parts by weight of a polymeric phosphorus-based flame retardant; (C) 0.1-3 parts by weight of a chain extender; and (D) 0.5-3 parts by weight of sodium antimonate.

The polyester resin (A) may suitably be at least one selected from among polyethylene terephthalate (PET), polybutylene terephthalate (PBT), polypropylene terephthalate (PPT), polycyclohexanedimethanol terephthalate (PCT), polynaphthalene terephthalate (PEN), etc.

The polymeric phosphorus-based flame retardant (B) may be a flame retardant having a repeat unit of the following formula 1 and a weight-average molecular weight ranging from 80,000 to 150,000:

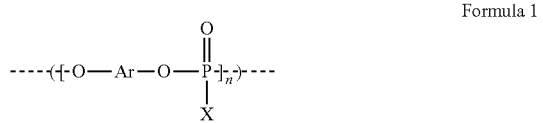

Formula 1 wherein Ar is an aromatic group, each X is, independently, a $C_{1-20}$ alkyl, a $C_{2-20}$ alkene, a $C_{2-20}$ alkyne, a $C_{5-20}$ cycloalkyl, or a $C_{6-20}$ aryl, and n is an integer ranging from 1 to 100.

The chain extender (C) is a compound of the following formula 2, which contains an epoxy group and comprises a copolymer based on styrene, acrylate or methacrylate. This compound has two or more epoxy groups in the molecule:

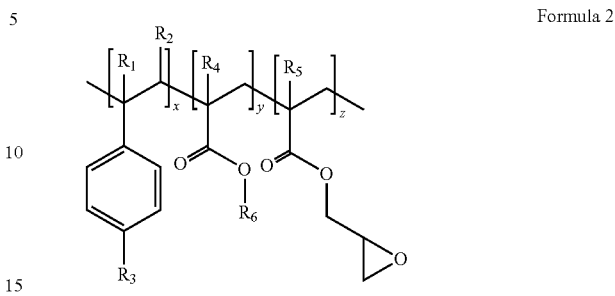

Formula 2 wherein each of $R_1$ to $R_5$ are each, independently, hydrogen or an alkyl group, $R_6$ is an alkyl group, and x, y and z are each, independently, an integer ranging from 1 to 20.

The sodium antimonate (D) is a compound having an average particle diameter of 0.1-1.0 μm and is represented by the following formula 3:

$$Na_2SbO_3 \cdot nH_2O$$ Formula 3

The flame-retardant polyester artificial hair filaments according to the present disclosure may further include conventional additives, including an inorganic quencher, a thermal stabilizer, a light stabilizer, a UV stabilizer, a fluorescent agent, an antioxidant, an antistatic agent, a pigment, a dye, a plasticizer, a lubricant, a flame retardant, a flame retardant aid, an inorganic filler, etc.

The flame-retardant polyester artificial hair filaments according to the present disclosure may have a fineness of 40-100 denier. The artificial hair filaments are used to make a wig.

The flame-retardant polyester artificial hair filaments according to the present disclosure is prepared by a method comprising the steps of: extruding a composition comprising a mixture of a polyester resin, a polymeric phosphorus-based flame retardant, a chain extender and sodium antimonate to form a pellet; drying the pellet to a water content of 500 ppm or less; melt-spinning the dried pellet to prepare a undrawn yarn; drawing the undrawn yarn at a draw ratio of 2-5; and heat-treating the drawn yarn in a heat treatment device heated to a temperature of 150~280° C.

DESCRIPTION OF EMBODIMENTS

The present disclosure relates to a polyester filaments for artificial hair, and more particularly to a polyester artificial hair filaments containing a polyester resin and a polymeric phosphorus-based flame retardant.

A flame-retardant polyester artificial hair filaments according to the present disclosure comprises: (A) 100 parts by weight of a thermoplastic polyester filaments; (B) 10-30 parts by weight of a polymeric phosphorus-based flame retardant; (C) 0.1-3 parts by weight of a chain extender; (D) 0.5-3 parts by weight of sodium antimonate; and (E) a small amount of a conventional additive. Each of the components of the flame-retardant polyester artificial hair filaments will now be described in detail.

(A) Polyester Resin

In the present disclosure, a polyester resin is used as a base resin. Suitable examples of the resin include polyethylene terephthalate (PET), polybutylene terephthalate (PBT), polypropylene terephthalate (PPT), polycyclohexanedimethanol terephthalate (PCT), polynaphthalene terephthalate (PEN), etc., which may be used alone or in the form of mixtures or copolymers of two more thereof. These resins may be commercial products that are easily commercially available.

(B) Polymeric Phosphorus-Based Flame Retardant

The polymeric phosphorus-based flame retardant (B) that is used in the present disclosure may suitably be a flame retardant having a repeat unit of the following formula 1 and a weight-average molecular weight ranging from 80,000 to 150,000:

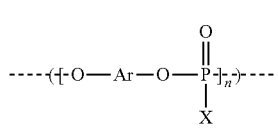

Formula 1 wherein Ar is an aromatic group, each X is, independently, a $C_{1-20}$ alkyl, a $C_{2-20}$ alkene, a $C_{2-20}$ alkyne, a $C_{5-20}$ cycloalkyl, or a $C_{6-20}$ aryl, and n is an integer ranging from 1 to 100.

The phosphorus-based flame retardant is a polymeric phosphorus-based flame retardant containing polyphosphonate. Specifically, it is a polyphosphonate flame retardant prepared by polymerizing diaryl alkyl phosphonate, diaryl aryl phosphonate, or a combination thereof, with dihydric phenols, bisphenols, or a combination thereof, which are aromatic dihydroxy compounds.

This flame retardant is used in an amount of 10-30 parts by weight based on 100 parts by weight of the polyester resin. If the flame retardant is used in an amount of less than 10 parts by weight, sufficient flame retardancy for artificial hair and drip resistance upon melting will not be ensured, and if the flame retardant is used in an amount of more than 30 parts by weight, the flow rate of the molten polymer composition will be too high, making melt spinning impossible. In some embodiments, the flame retardant is used in an amount of 15-25 parts by weight.

(C) Chain Extender

The chain extender (C) is a compound of the following formula 2, which contains an epoxy group and comprises a copolymer based on styrene, acrylate or methacrylate. This compound has two or more epoxy groups in the molecule.

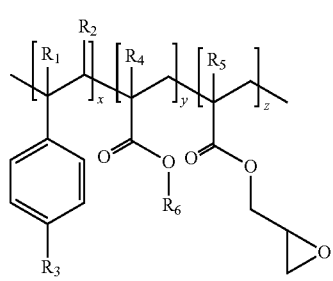

Formula 2 wherein each of $R_1$ to $R_5$ are each, independently, hydrogen or an alkyl group, $R_6$ is an alkyl group, and x, y and z are each, independently, an integer ranging from 1 to 20.

The chain extender should be used in such an amount that the melt tension of the molten polymer in a melt spinning process can be maintained at a suitable level. The chain extender is used in an amount of 0.1-3 parts by weight or 0.3-1.3 parts by weight, based on 100 parts by weight of the sum of the polyester resin and the phosphorus-based flame retardant. If the chain extender is used in an amount of less than 0.1 parts by weight, the melt tension of the molten polymer will be insufficient, and if the chain extender is used in an amount of 3 parts by weight, the melt tension of the molten polymer will excessively increase, and thus the discharge of the molten polymer from fine nozzle holes will decrease.

In the present disclosure, a chain stabilizer may additionally be used to improve the extrusion stability of molten polymer strands. The chain stabilizer is an acrylic copolymer having an epoxy reactive group, for example, glycidyl acrylate, glycidyl methacrylate or the like. In addition, it may also be a copolymer of a monomer having an epoxy reactive group with an acrylic monomer having no epoxy reactive group. Examples of the acrylic monomer having no epoxy reactive group include alkyl methacrylate, alkyl acrylate, styrene derivatives, etc. Specifically, the chain stabilizer that is used in the present disclosure may be a low-molecular-weight styrene-acrylate copolymer having 3-9 glycidyl reactive groups.

(D) Sodium Antimonate

The sodium antimonate (D) is a compound having an average particle diameter of 0.1-1.0 μm and represented by the following formula 3:

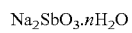

Formula 3

The sodium antimonate together with the chain extender in the present disclosure has the effect of reducing the flow rate of the molten polymer that is discharged from nozzles in a high-temperature melt spinning process. Particularly, the sodium antimonate can exhibit a synergistic effect with a chain extender composed of a styrene-acrylate copolymer having an epoxy reactive group as described in the present disclosure.

The sodium antimonate has a light transparency higher than antimony trioxide ($Sb_2O_3$) used in the prior art, and thus is suitable for use in flame-retardant polyester artificial hair requiring transparency.

The sodium antimonate is used in an amount of 0.1-5 parts by weight or 0.5-3 parts by weight, based on 100 parts by weight of the polyester resin. If the sodium antimonate is used in an amount of less than 0.1 parts by weight, it will have an insignificant effect on the stabilization of the flow rate of the molten polymer, and if the sodium antimonate is used in an amount of more than 5 parts by weight, it will make the color of colored artificial hair turbid, making it difficult to obtain artificial hair having a clear color. In addition, the generation of single yarns in spinning and drawing processes will increase, surface protrusions will occur, and the entanglement of the resulting filaments upon combing will increase, suggesting that the resulting filaments is not suitable for use as artificial hair filaments.

(E) Other Additives

In addition to the above-described components, the artificial hair filaments according to present disclosure may, if necessary, further comprise conventional additives, including an inorganic quencher, a thermal stabilizer, a light stabilizer, a UV stabilizer, a fluorescent agent, an antioxidant, an antistatic agent, a pigment, a dye, a plasticizer, a lubricant, a flame retardant, a flame retardant aid, an inorganic filler, etc. These additives may be used along or in a mixture of two or more.

The flame-retardant polyester artificial hair filaments according to the present disclosure have a fineness of 40-100 denier. The artificial hair filaments are used to make a wig.

The flame-retardant polyester artificial hair filaments according to the present disclosure is prepared by a method comprising the steps of: extruding a composition comprising a mixture of a polyester resin, a polymeric phosphorus-based flame retardant, a chain extender and sodium antimonate to form a pellet; drying the pellets to a water content of 500 ppm or less; melt-spinning the dried pellet to prepare a undrawn yarn; drawing the undrawn yarn at a draw ratio of 2-5; and heat-treating the drawn yarn in a heat treatment device heated to a temperature of 150~280° C.

Because the polyester resin that is used as a base resin in the present disclosure has high melt flow rate, in some embodiments it is sufficiently dried to remove water before mixing with the flame retardant or before melt spinning.

In some embodiments, a drying step may further be performed before the step of extruding the composition to form pellets. The drying step is generally performed in a nitrogen atmosphere at a temperature of 80~180° C. for 3-10 hours. In some embodiments, the drying step is performed at a temperature of 95~150° C. for 4-8 hours. The water content of the composition after the drying step is 500 ppm or lower, such as 0-100 ppm. If the composition is not sufficiently dried, the number of spinning failures in a spinning process can increase.

The dried composition is extruded according to a conventional method to form pellets. In some embodiments, the extrusion is performed using a twin screw extruder.

The extruded pellets can be melt-spun according to a conventional method. In one embodiment, the composition is extruded through an extruder having a nozzle mounted at the front end, thereby preparing undrawn yarns. The shape of a spinneret that is used in the melt spinning process is not specifically limited and is, for example, a peanut shape, a star shape, an oval shape, a hollow oval shape or the like. The spinning temperature that is the temperature of the extruder cylinder is 200~280° C.

The undrawn yarns are drawn at a draw ratio of 3-5 in a drawing machine. The drawing machine that is used in the present disclosure may be a conventional heating drum drawing machine, but is not limited thereto.

The drawn yarns are heat-treated in a heat treatment device heated to a temperature of 150~280° C. The heat-treatment process and the heat-treatment device can be easily carried out by those skilled in the art to which the present disclosure pertains.

The flame-retardant polyester artificial hair filaments according to the present disclosure are not substantially deformed even by a hair iron at 120~200° C., and thus has excellent heat resistance. In addition, it has a very high flame retardancy, does not substantially drip, has gloss similar to that of human hair, and also has a clear color. Thus, it is very suitable for use as a wig.

The present disclosure will be better understood with reference to the following examples, which are for illustrative purposes and are not intended to limit the scope of the present disclosure as defined in the appended claims.

EXAMPLES

The specifications of the components used in each of Examples 1 to 6 and Comparative Examples 1 to 8 are as follows.
(A) Polyester resins
   (A-1) SB chip (Huvis Corp.) having an intrinsic viscosity of 0.65 dl/g.
   (A-2) Chip (Woongjin Chemical Co.) for bottles, which has an intrinsic viscosity of 0.80 dl/g.
(B) Polymeric phosphorus-based flame retardant: Nofla® HM1100 (FRX Polymers Inc.) having a number-average molecular weight.
(C) Chain extender: Joncryl® ADR4370 (BASF).
(D) Sodium antimonate: SA-A® (Nippon Seiko Co. Ltd.).

The above-described components were mixed with each other in the amounts shown in Tables 1 to 3 below. The mixture was dried under a nitrogen atmosphere at 130° C. for 6 hours, and then extruded through a twin screw compounder to prepare pellets. The pellets were dried to a water content of 500 ppm or lower under a nitrogen atmosphere at 130° C. for 6 hours immediately before spinning, after which the dried pellets were placed in an extruder having a 160-hole nozzle attached to the front end and were melt-spun to prepare a 200-denier undrawn yarn. The spinning temperature that was the temperature of the extruder cylinder was 250~280° C. The undrawn yarn was drawn 3.5 times in a heating drum drawing machine to prepare a drawn yarn. The drawn yarn was heat-treated in a heat-treatment device heated to 250° C., thereby preparing artificial hair filaments having a fineness of 30-100 denier.

In Examples 1 to 3 and Comparative Examples 1 and 2 as shown in Table 1 below, the contents of the chain extender and the sodium antimonate were maintained at constant levels, and the content of the phosphorus-based flame retardant was changed.

In Example 4 and Comparative Examples 3 to 6 as shown in Table 2 below, the contents of the phosphorus-based flame retardant and the sodium antimonate were maintained at constant levels, and the content of the chain extender was changed.

In Examples 5 and 6 and Comparative Examples 7 and 8 as shown in Table 2 below, the contents of the phosphorus flame retardant and the chain extender were maintained at constant levels, and the content of the sodium antimonate was changed.

Physical properties were measured in the following manner, and the results of the measurement are shown in Tables 1 to 3 below.

TABLE 1

|  | Ex. 1 | Ex. 2 | Ex. 3 | Comp. Ex. 1 | Comp. Ex. 2 |
|---|---|---|---|---|---|
| (A) Polyester Resin |  |  |  |  |  |
| * A-1 PET | 100 | 100 |  | 100 | 100 |
| * A-2 Solid PET |  |  | 100 |  |  |
| (B) Polymeric Phosphorus-based Flame Retardant | 15 | 20 | 20 | 5 | 30 |
| (C) Chain Extender | 1.0 | 1.0 | 1.0 | 1.0 | 1.0 |
| (D) Sodium Antimonate | 0.9 | 0.8 | 0.8 | 0.8 | 0.8 |
| Strength | 1.9 | 1.7 | 2.1 | 2.3 | 1.4 |
| Elongation | 100 | 110 | 95 | 135 | 70 |
| Anti-dripping | ○ | ◎ | ○ | X | ◎ |
| Heat Resistance | ○ | ○ | ○ | ◎ | Δ |
| Curling | ◎ | ◎ | ◎ | ○ | ○ |
| Color | ○ | ○ | ○ | ○ | ○ |
| Gloss | ◎ | ◎ | ◎ | Δ | Δ |
| Processability | ◎ | ◎ | ◎ | ◎ | X |

TABLE 2

|  | Ex. 4 | Comp. Ex. 3 | Comp. Ex. 4 | Comp. Ex. 5 | Comp. Ex. 6 |
|---|---|---|---|---|---|
| (A) Polyester Resin |  |  |  |  |  |
| * A-1 PET | 100 |  | 100 | 100 | 100 |
| * A-2 Solid PET |  | 100 |  |  |  |
| (B) Polymeric Phosphorus-based Flame Retardant | 20 | 20 | 20 | 20 | 20 |
| (C) Chain Extender | 1.0 | 1.0 | 1.0 | 4 | 5 |
| (D) Sodium Antimonate | 0.8 | 0.8 | 0.8 | 0.8 | 0.8 |
| Strength | 1.9 | 1.6 | 1.5 | 1.5 | Filaments Unobtainable |
| Elongation | 100 | 105 | 125 | 83 |  |
| Anti-dripping | ○ | ◎ | ◎ | ◎ |  |
| Heat Resistance | ○ | ○ | ○ | ○ |  |
| Curling | ◎ | ○ | ◎ | ○ |  |
| Color | ○ | ○ | ○ | ○ |  |
| Gloss | ◎ | ○ | ◎ | ○ |  |
| Processability | ◎ | X | X | Δ |  |

TABLE 3

|  | Ex. 5 | Ex. 6 | Comp. Ex. 7 | Comp. Ex. 8 |
|---|---|---|---|---|
| (A) Polyester Resin |  |  |  |  |
| * A-1 PET | 100 | 100 | 100 | 100 |
| * A-2 Solid PET |  |  |  |  |
| (B) Polymeric Phosphorus-based Flame Retardant | 20 | 20 | 20 | 20 |
| (C) Chain Extender | 1.0 | 1.0 | 1.0 | 1.0 |
| (D) Sodium Antimonate | 0.8 | 1.5 | 0.1 | 5 |
| Strength | 1.7 | 1.7 | 1.8 | 1.5 |
| Elongation | 110 | 110 | 105 | 115 |
| Anti-dripping | ◎ | ◎ | Δ | Δ |
| Heat Resistance | ○ | ○ | ○ | ◎ |
| Curling | ◎ | ◎ | ◎ | ◎ |
| Color | ○ | ○ | ○ | X |
| Gloss | ◎ | ○ | X | X |
| Processability | ◎ | ◎ | X | X |

Strength and elongation: Artificial hair composed of a filament bundle (320 strands) was cut to a length of 90 cm, and the actual thickness (De) of the cut filaments was calculated and the strength and elongation thereof were measured five times by a pull-to-break test using a universal testing machine (UTM; load cell: 100 kgf; initial load: 0.5 kgf; speed: 200 mm/min; length: 20 mm).

Flame retardancy: A filament bundle (160 strands) was cut to a length of 15 cm. The cut filaments was brought into contact with a 2-cm flame for 5 seconds, and then the time taken for the flame to be extinguished was measured. Evaluation was performed according to the following criteria: ◎: flame extinguishing time shorter than 1 second, ○: flame extinguishing time shorter than 3 seconds, Δ: flame extinguishing time shorter than 5 seconds, and x: flame extinguishing time longer than 6 seconds.

Melt drip property: A filaments bundle was brought into contact with flame, and the dripping of the molten resin when catching fire was measured. The drip property was determined by measuring the number of molten resin drips. Specifically, a filaments bundle (160 strands) was drooped vertically and brought into contact with a 30-mm flame, and the number of drips from the filaments was measured while 100 mm of the filaments was burned. Evaluation was performed according to the following criteria: ◎: drip number of 0, ○: drip number of 1-2, Δ: drip number of 3-4, and x: drip number larger than 4.

Heat resistance: 10 drawn yarns (160 strands) were bundled, and the yarn bundle was inserted into a specifically manufactured domestic electric hair iron heated to 230° C. and was heated for 10 seconds. Then, the deformation of the filaments by shrinkage, the deformation by thermal stress and the like were visually observed. The absence of deformation after heat treatment was judged as good heat resistance, and the presence of deformation after heat treatment was judged as poor heat resistance. Evaluation was performed according to the following criteria: ◎: no deformation, ○: slight shrinkage that did not damage the appearance, Δ: shrinkage that did damage the appearance, x: occurrence of shrinkage and melting.

Gloss: Artificial filaments composed of a 80,000-denier filament bundle (160 holes×50 denier×10 strands) was cut to a length of 10 cm, and the gloss of the cut filaments was visually observed under sunlight. Evaluation was performed according to the following criteria: ◎: gloss similar to that of human hair, ○: gloss higher than that of human hair, Δ: gloss lower than that of human hair, and x: dull gloss lower than that of human hair.

Color: Artificial filaments composed of a 80,000-denier filament bundle (160 holes×50 denier×10 strands) was cut to a length of 10 cm, and the color of the cut filaments was visually observed under sunlight. The color clearness was evaluated according to the following four criteria: ◎: most clear, ○: clear, Δ: slightly not clear, and x: turbid).

Processability: The number of spinning failures for 5 hours in a spinning process was measured. Evaluation was performed according to the following criteria: ◎: spinning failure number of 0, ○: spinning failure number of 1, Δ: spinning failure number of 2-3, and x: spinning failure number of 4 or more and impossible spinning.

What is claimed is:
1. A flame-retardant polyester artificial hair filaments, which comprises:
   (A) 100 parts by weight of a thermoplastic polyester resin;
   (B) 10-30 parts by weight of a polymeric phosphorus-based flame retardant, wherein the polymeric phosphorus-based flame retardant is a flame retardant having a repeat unit of the following Formula 1 and a weight-average molecular weight ranging from 80,000 to 150,000:

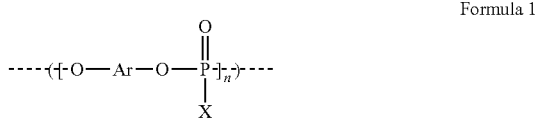

Formula 1 wherein Ar is an aromatic group, each X is, independently, a $C_{1-20}$ alkyl, a $C_{2-20}$ alkene, a $C_{2-20}$ alkyne, a $C_{5-20}$ cycloalkyl, or a $C_{6-20}$ aryl, and n is an integer ranging from 1 to 100;
   (C) 0.1-3 parts by weight of a chain extender; and
   (D) 0.5-3 parts by weight of sodium antimonate.
2. The flame-retardant polyester artificial hair filaments of claim 1 in which said polyester resin (A) is selected from the group consisting of polyethylene terephthalate (PET), polybutylene terephthalate (PBT), polypropylene terephthalate (PPT), polycyclohexanedimethanol terephthalate (PCT), and polynaphthalene terephthalate (PEN).

3. The flame-retardant polyester artificial hair filaments of claim 1 in which said sodium antimonate (D) is a compound having an average particle diameter of 0.1-1.0 μm and is represented by Formula 3: $Na_2SbO_3 \cdot nH_2O$.

4. The flame-retardant polyester artificial hair filaments of claim 1 which further comprise an inorganic quencher, a thermal stabilizer, a light stabilizer, a UV stabilizer, a fluorescent agent, an antioxidant, an antistatic agent, a pigment, a dye, a plasticizer, a lubricant, a flame retardant, a flame retardant aid, or an inorganic filler.

5. The flame-retardant polyester artificial hair filaments of claim 1 which has a fineness of 40-100 denier.

6. A wig prepared with the flame-retardant polyester artificial hair filaments of claim 1.

7. A method of flame-retardant polyester artificial hair filaments, which comprises:
   extruding a composition comprising a mixture of a polyester resin, a polymeric phosphorus-based flame retardant, a chain extender and sodium antimonate to form pellets, wherein the polymeric phosphorus-based flame retardant is a flame retardant having a repeat unit of the following Formula 1 and a weight-average molecular weight ranging from 80,000 to 150,000:

Formula 1

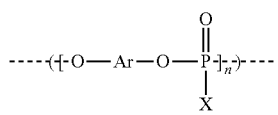

wherein Ar is an aromatic group, each X is, independently, a $C_{1-20}$ alkyl, a $C_{2-20}$ alkene, a $C_{2-20}$ alkyne, a $C_{5-20}$ cycloalkyl, or a $C_{6-20}$ aryl, and n is an integer ranging from 1 to 100;
drying the pellets to a water content of 500 ppm or less;
melt-spinning the dried pellets to prepare undrawn yarn;
drawing the undrawn yarn at a draw ratio of 2-5; and
heat-treating the drawn yarn in a heat treatment device heated to a temperature of 150~280° C.

8. A flame-retardant polyester artificial hair filaments, which comprises:
   (A) 100 parts by weight of a thermoplastic polyester resin;
   (B) 10-30 parts by weight of a polymeric phosphorus-based flame retardant;
   (C) 0.1-3 parts by weight of a chain extender, wherein the chain extender is a compound of Formula 2, which contains an epoxy group and comprises a copolymer based on styrene, acrylate or methacrylate:

Formula 2

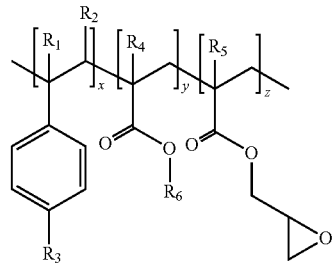

wherein each of $R_1$ to $R_5$ are each, independently, hydrogen or an alkyl group, $R_6$ is an alkyl group, and x, y and z are each, independently, an integer ranging from 1 to 20; and
   (D) 0.5-3 parts by weight of sodium antimonate.

9. The flame-retardant polyester artificial hair filaments of claim 8 in which said polyester resin (A) is selected from the group consisting of polyethylene terephthalate (PET), polybutylene terephthalate (PBT), polypropylene terephthalate (PPT), polycyclohexanedimethanol terephthalate (PCT), and polynaphthalene terephthalate (PEN).

10. The flame-retardant polyester artificial hair filaments of claim 8 in which said sodium antimonate (D) is a compound having an average particle diameter of 0.1-1.0 μm and is represented by Formula 3: $Na_2SbO_3 \cdot nH_2O$.

11. The flame-retardant polyester artificial hair filaments of claim 8 which further comprise an inorganic quencher, a thermal stabilizer, a light stabilizer, a UV stabilizer, a fluorescent agent, an antioxidant, an antistatic agent, a pigment, a dye, a plasticizer, a lubricant, a flame retardant, a flame retardant aid, or an inorganic filler.

12. The flame-retardant polyester artificial hair filaments of claim 8 which has a fineness of 40-100 denier.

13. A wig prepared with the flame-retardant polyester artificial hair filaments of claim 8.

* * * * *